United States Patent
Tanaka

(10) Patent No.: US 9,282,204 B2
(45) Date of Patent: Mar. 8, 2016

(54) COMMUNICATION APPARATUS, COMMUNICATION CONTROL APPARATUS, COMMUNICATION SYSTEM, AND COMMUNICATION METHOD

(75) Inventor: Tatsuyuki Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 209 days.

(21) Appl. No.: 13/562,965

(22) Filed: Jul. 31, 2012

(65) Prior Publication Data

US 2013/0215457 A1 Aug. 22, 2013

(30) Foreign Application Priority Data

Feb. 16, 2012 (JP) ................................ 2012-031563

(51) Int. Cl.
*H04N 1/00* (2006.01)

(52) U.S. Cl.
CPC ...... *H04N 1/0022* (2013.01); *H04N 2201/0094* (2013.01)

(58) Field of Classification Search
CPC ......... H04N 1/00209; H04N 1/00214; H04N 1/00217; H04N 1/0022; H04N 2201/0093; H04N 1/32411; H04N 2201/0094
USPC ........... 358/1.15, 407, 400; 379/219, 220.01, 379/221.01, 221.14
See application file for complete search history.

(56) References Cited

U.S. PATENT DOCUMENTS

| | | | | |
|---|---|---|---|---|
| 6,058,169 A | * | 5/2000 | Bramnick | H04N 1/00209 358/407 |
| 6,307,853 B1 | * | 10/2001 | Storch | H04L 12/5692 370/354 |
| 2006/0056387 A1 | * | 3/2006 | Tanimoto | 370/351 |
| 2006/0262773 A1 | * | 11/2006 | Tanimoto | 370/351 |

FOREIGN PATENT DOCUMENTS

| | | |
|---|---|---|
| GB | 2 435 148 A | 8/2007 |
| JP | A-2006-81044 | 3/2006 |

* cited by examiner

*Primary Examiner* — Kent Yip
(74) *Attorney, Agent, or Firm* — Oliff PLC

(57) ABSTRACT

A communication apparatus includes an acquisition unit, an instruction accepting unit, a generating unit, and a data transmitting unit. The acquisition unit acquires a transmission-source port number which indicates a transmission source of data and which is determined every time transmission of data is to be performed. The instruction accepting unit accepts an instruction which is an instruction to transmit data via a first communication network or an instruction to transmit data via a second communication network. When the accepted instruction is an instruction to transmit data via the second communication network, the generating unit generates data including the acquired transmission-source port number. The data transmitting unit transmits the generated data via a communication control apparatus connected to the first and second communication networks. The communication control apparatus performs routing so that a route via the first or second communication network is selected for the transmitted data.

9 Claims, 6 Drawing Sheets

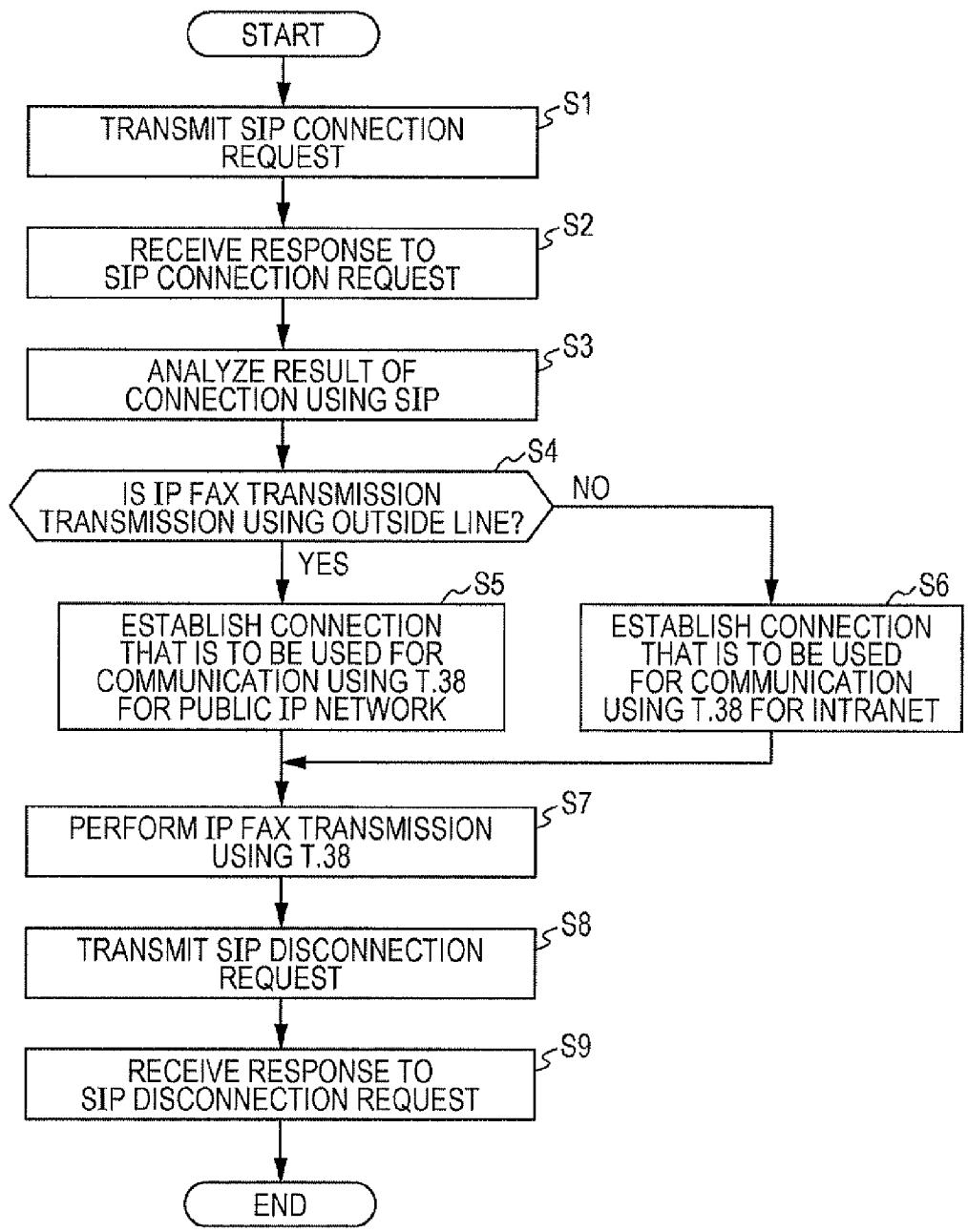

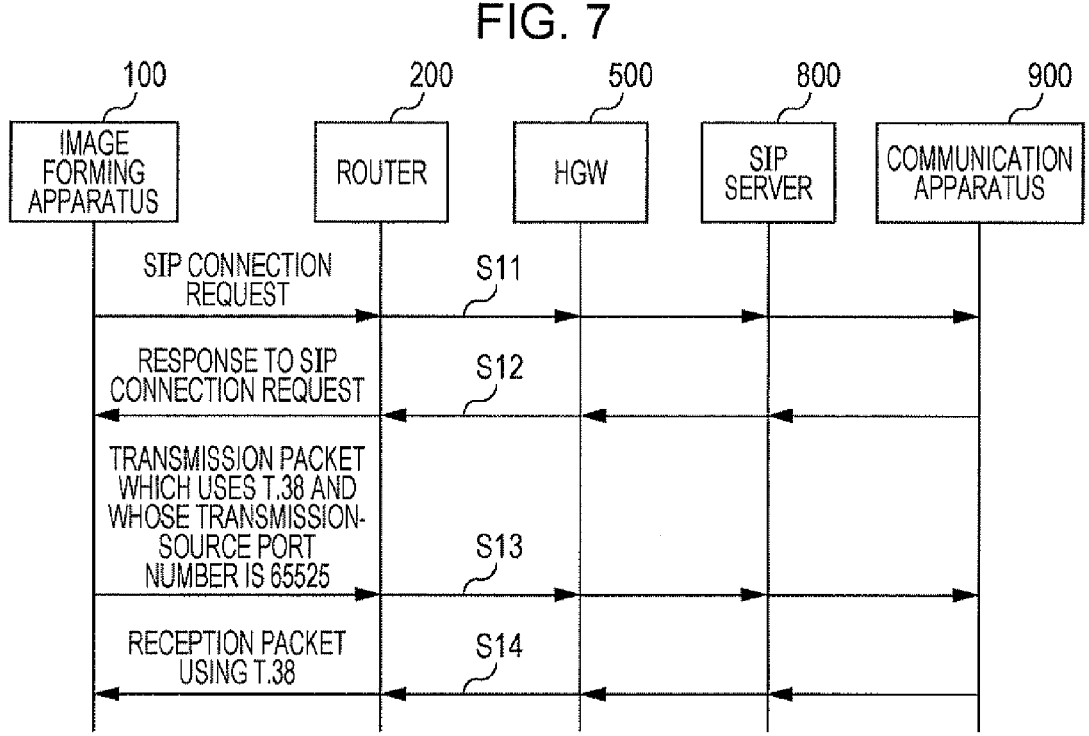
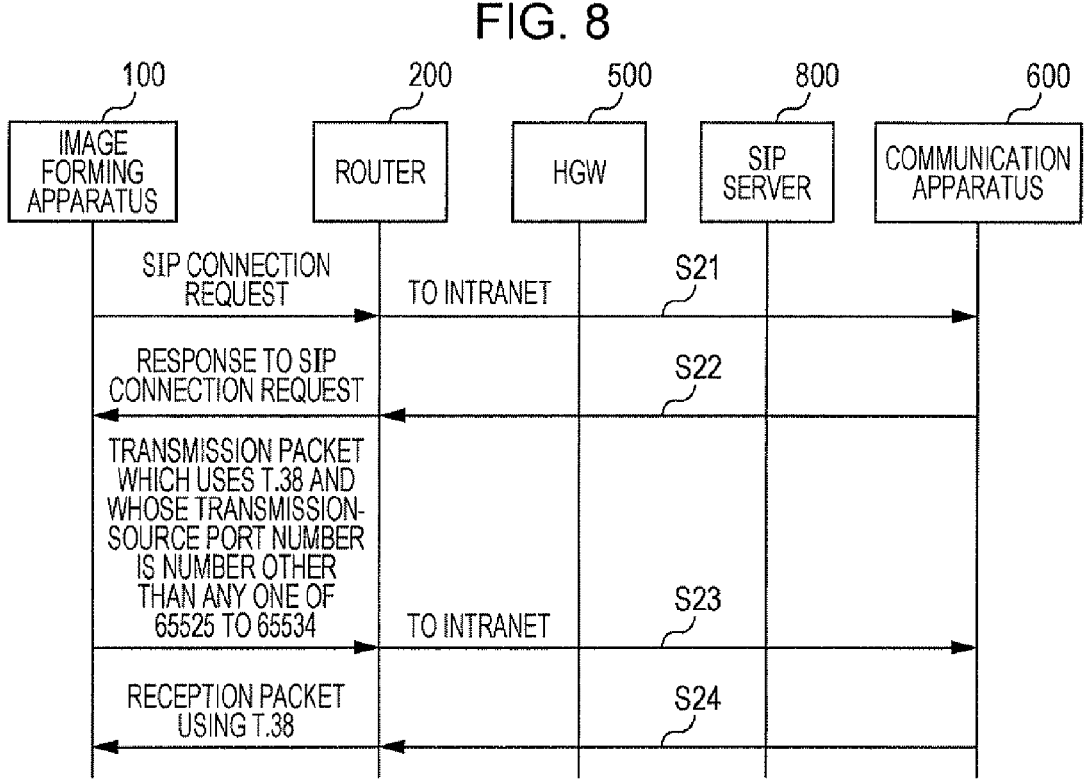

COMMUNICATION APPARATUS, COMMUNICATION CONTROL APPARATUS, COMMUNICATION SYSTEM, AND COMMUNICATION METHOD

CROSS-REFERENCE TO RELATED APPLICATIONS

This application is based on and claims priority under 35 USC 119 from Japanese Patent Application No. 2012-031563 filed Feb. 16, 2012.

BACKGROUND (i) Technical Field

The present invention relates to a communication apparatus, a communication control apparatus, a communication system, and a communication method.

(ii) Related Art

Facsimile communication via an Internet protocol (IP) network using IP has been used. Such facsimile communication is called IP fax communication.

SUMMARY

According to an aspect of the invention, there is provided a communication apparatus including an acquisition unit, an instruction accepting unit, a generating unit, and a data transmitting unit. The acquisition unit acquires a transmission-source port number which indicates a transmission source of data and which is determined every time transmission of data is to be performed. The instruction accepting unit accepts a transmission instruction which is a transmission instruction to transmit data via a first communication network or a transmission instruction to transmit data via a second communication network. When the transmission instruction accepted by the instruction accepting unit is a transmission instruction to transmit data via the second communication network, the generating unit generates data including the transmission-source port number acquired by the acquisition unit. The data transmitting unit transmits, via a communication control apparatus, the data generated by the generating unit. The communication control apparatus is an apparatus that performs routing for the transmitted data so that a route via the first communication network or a route via the second communication network is selected for the transmitted data in accordance with whether or not the transmission-source port number included in the transmitted data is a number which is determined in advance and that is connected to the first communication network and the second communication network.

BRIEF DESCRIPTION OF THE DRAWINGS

Exemplary embodiments of the present invention will be described in detail based on the following figures, wherein:

FIG. 6 is a flowchart illustrating a flow of a process performed by the image forming apparatus;

FIG. 7 is a sequence diagram for explaining operations performed in the communication system; and FIG. 8 is a sequence diagram for explaining operations performed in the communication system.

DETAILED DESCRIPTION

Figure 1:
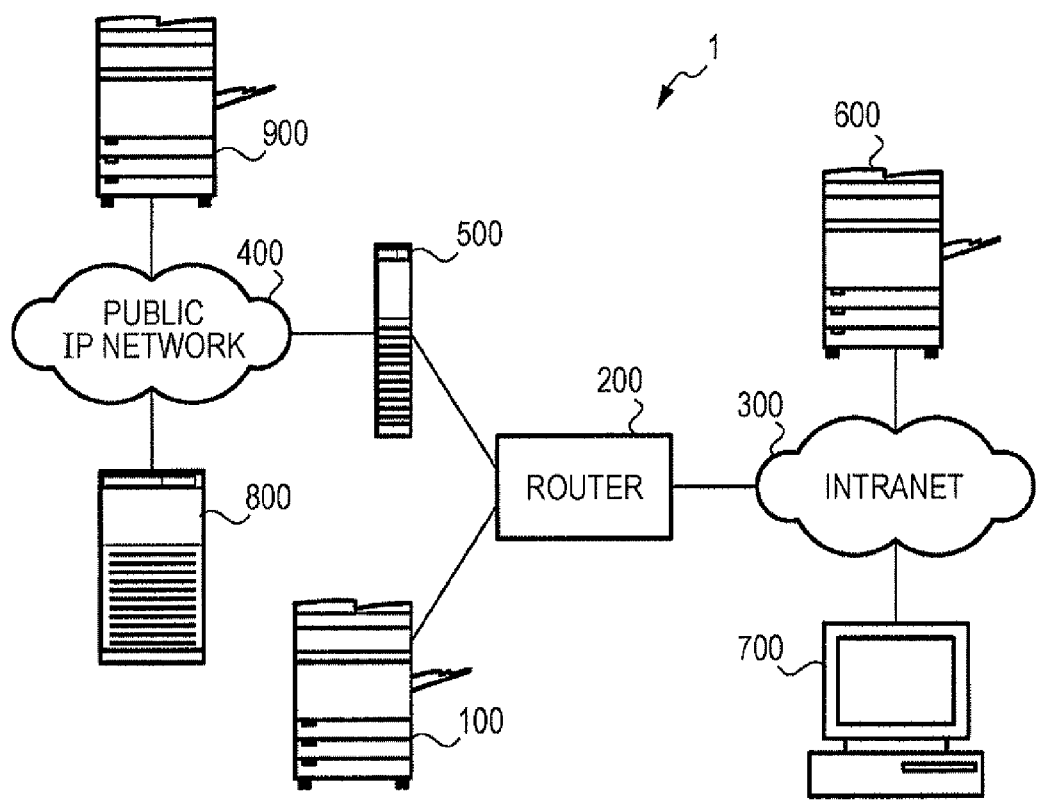
FIG. 1 is a block diagram illustrating an example of a configuration of a communication system according to an exemplary embodiment of the present invention.

FIG. 1 is a block diagram illustrating a configuration of a communication system 1 according to an exemplary embodiment of the present invention. The communication system 1 includes an image forming apparatus 100, a router 200, an intranet 300, a public IP network 400, a home gateway (hereinafter, referred to as a "HGW") 500, a communication apparatus 600, a communication apparatus 700, a session initiation protocol (SIP) server 800, and a communication apparatus 900. The image forming apparatus 100 is an example of a communication apparatus according to an exemplary embodiment of the present invention, and has, for example, the following functions: an image forming function of forming an image on a recording medium such as a sheet of paper in accordance with data transmitted from another computer apparatus such as a personal computer; a scan function of reading an image that is formed on a recording medium; and a facsimile function. Note that the image forming apparatus 100 is not limited to an apparatus having all of the above-mentioned functions. For example, the image forming apparatus 100 may be configured so as to have the facsimile function and so as not to have the other functions. The router 200 is a communication control apparatus that connects the intranet 300 and the public IP network 400 to each other. The intranet 300 is an example of a first communication network according to an exemplary embodiment of the present invention, and is, for example, a local area network (LAN). The public IP network 400 is an example of a second communication network according to an exemplary embodiment of the present invention, and is, for example, a next generation network (NGN). The public IP network 400 is connected to the router 200 via the HGW 500.

Both the communication apparatuses 600 and 700 are communication apparatuses that are connected to the intranet 300. The communication apparatus 600 is, for example, an image forming apparatus, and the communication apparatus 700 is, for example, a personal computer. The communication apparatus 600 that is an image forming apparatus is an apparatus having the image forming function and the facsimile function, which are described above. The SIP server 800 is provided in the public IP network 400, and is an apparatus that controls communication connection using SIP. The communication apparatus 900 is a communication apparatus that is connected to the public IP network 400. Note that, although one image forming apparatus that is the communication apparatus 600 and one PC that is the communication apparatus 700 are illustrated in an example illustrated in FIG. 1, the communication apparatuses connected to the intranet 300 are not limited thereto. For example, two or more communication apparatuses may be connected to the intranet 300. Furthermore, although communication apparatuses other than the communication apparatus 900 are also connected to the public IP network 400, illustration of the communication apparatuses is omitted in the example illustrated in FIG. 1 in order to prevent FIG. 1 from becoming complicated.

Figure 2:
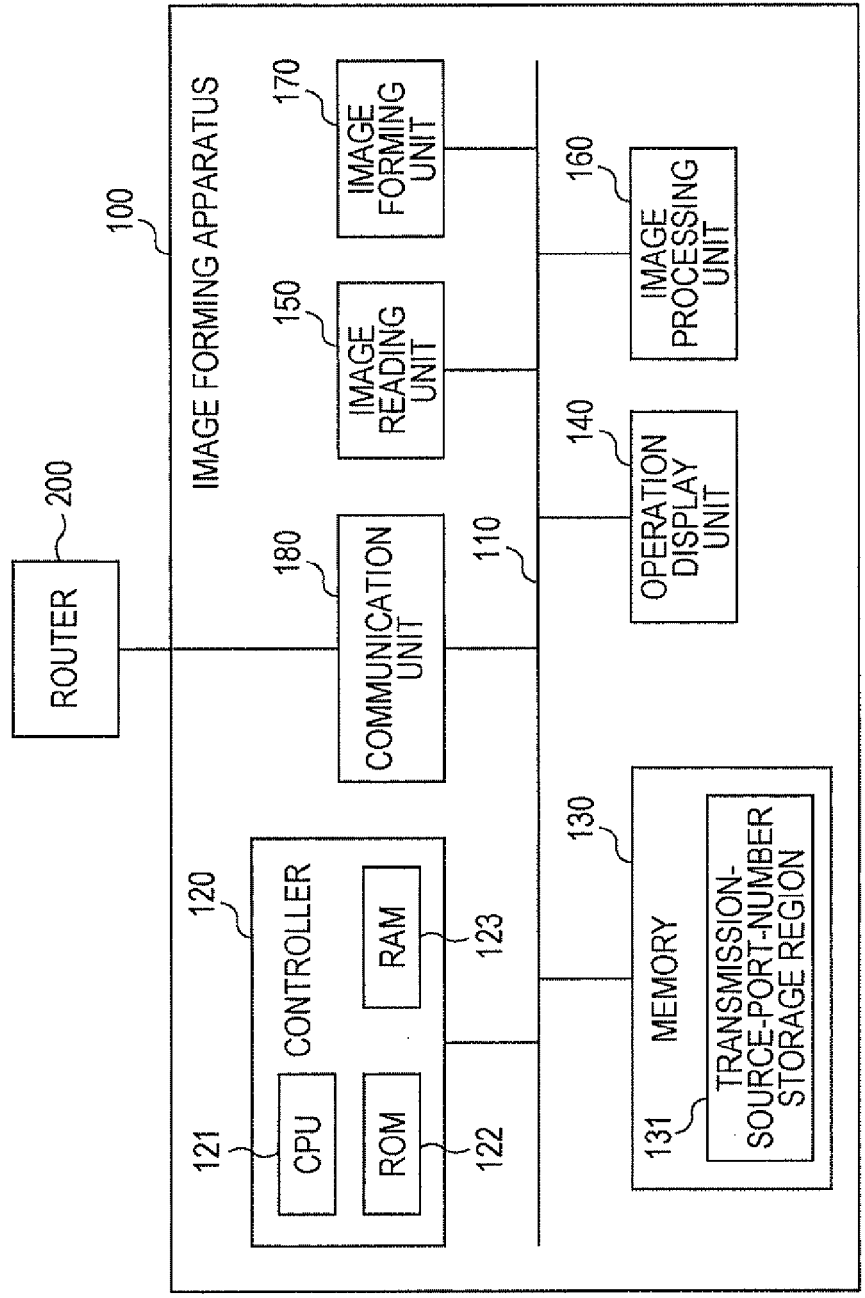
FIG. 2 is a block diagram illustrating an example of a configuration of an image forming apparatus.

FIG. 2 is a block diagram illustrating an example of a hardware configuration of the image forming apparatus 100. As illustrated in FIG. 2, individual units of the image forming apparatus 100 are connected to a bus 110, and send/receive data to/from each other via the bus 110. Referring to FIG. 2, a controller 120 includes a central processing unit (CPU) 121, a read-only memory (ROM) 122, and a random-access memory (RAM) 123. The controller 120 controls the image forming apparatus 100 in accordance with a computer program that is stored in the ROM 122 or a memory 130. The memory 130 is a storage unit such as a hard disk, and, in the memory 130, various types of programs such as programs associated with control of the image forming apparatus 100 are stored. An operation display unit 140 includes a liquid crystal display that functions as a touch panel. A user of the image forming apparatus 100 performs various types of operations by touching the liquid crystal display. A communication unit 180 is a so-called connector used for communication. The communication unit 180 is connected, using a communication cable, to the router 200, and performs data communication with an apparatus that is connected to the intranet 300 or the public IP network 400 via the router 200.

An image reading unit 150 includes optical-system-related members (not illustrated), optically reads an image formed on an original document, and generates image data representing the read image. An image processing unit 160 performs various types of image processing, such as color correction and tone correction, on the image represented by the image data. The image processing unit 160 generates, from the image data that has been subjected to the various types of image processing, image data regarding images of individual colors that are yellow (Y), magenta (M), cyan (C), and black (B). The image processing unit 160 performs screen processing on the generated image data to obtain image data, and outputs the obtained image data to an image forming unit 170. The image processing unit 160 is configured using an integrated circuit such as an application specific integrated circuit (ASIC). The image forming unit 170 generates toner images of the individual colors, which are Y, M, C, and K, on the basis of the image data, which has been generated by the image processing unit 160, for the individual colors, which are Y, M, C, and K. The image forming unit 170 transfers the toner images onto a recording medium, and fixes the toner images, thereby forming an image on the recording medium.

A memory 130 has a transmission-source-port-number storage region 131. In the transmission-source-port-number storage region 131, transmission-source port numbers (or information indicating transmission-source port numbers) that are used in the case where the image forming apparatus 100 performs facsimile communication with a communication apparatus connected to the public IP network 400 are stored. In the exemplary embodiment, in the transmission-source-port-number storage region 131, information indicating port numbers (for example, 65525 to 65534) that are in a range which is determined in advance is stored.

Figure 3:
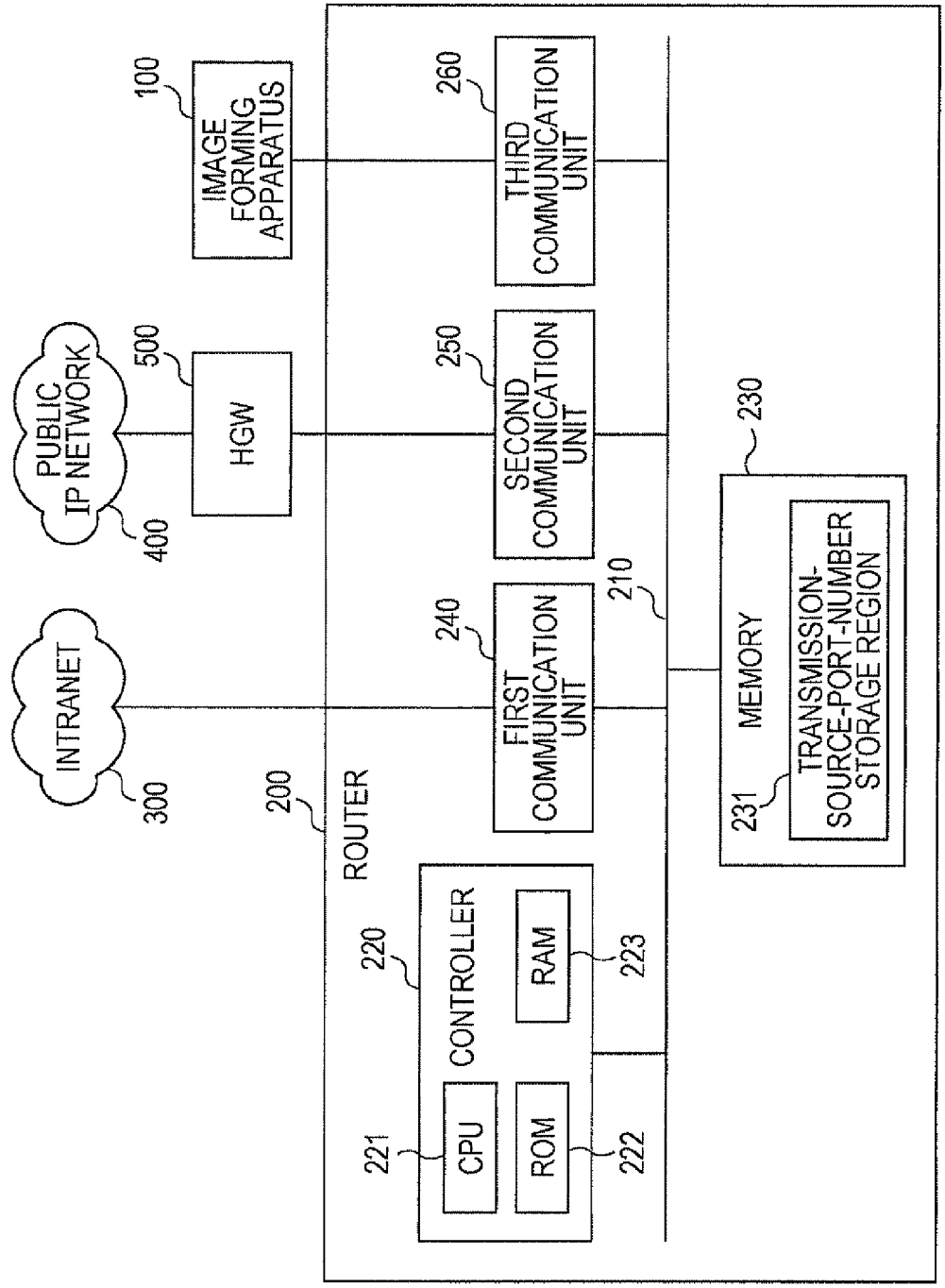
FIG. 3 is a block diagram illustrating an example of a configuration of a router.

FIG. 3 is a block diagram illustrating an example of a hardware configuration of the router 200. As illustrated in FIG. 3, individual units of the router 200 are connected to a bus 210, and send/receive data to/from each other via the bus 210. Referring to FIG. 2, a controller 220 includes a CPU 221, a ROM 222, and a RAM 223, and controls the router 200 in accordance with a computer program that is stored in the ROM 222 or a memory 230. The memory 230 is a memory such as a hard disk, and, in the memory 230, various types of programs such as programs associated with control of the router 200 are stored.

A first communication unit 240 is connected, using a communication cable, to the intranet 300, and sends/receives data to/from an apparatus that is connected to the intranet 300. A second communication unit 250 is connected, using a communication cable, to the public IP network 400 via the HGW 500, and sends/receives data to/from an apparatus that is connected to the public IP network 400. A third communication unit 260 is connected, using a communication cable, to the image forming apparatus 100, and sends/receives data to/from the image forming apparatus 100. Note that a configuration in which the router 200 and the image forming apparatus 100 are connected to each other via the intranet 300 may be used instead of the configuration in which the router 200 and the image forming apparatus 100 are directly connected to each other.

The memory 230 has a transmission-source-port-number storage region 231. In the transmission-source-port-number storage region 231, transmission-source port numbers that are referred to in the case where routing is performed for a transmitted packet (data) are stored. Information stored in the transmission-source-port-number storage region 231 is similar to that stored in the transmission-source-port-number storage region 131. The transmission-source-port-number storage region 231 is an example of a memory according to an embodiment of the present invention.

Figure 4:
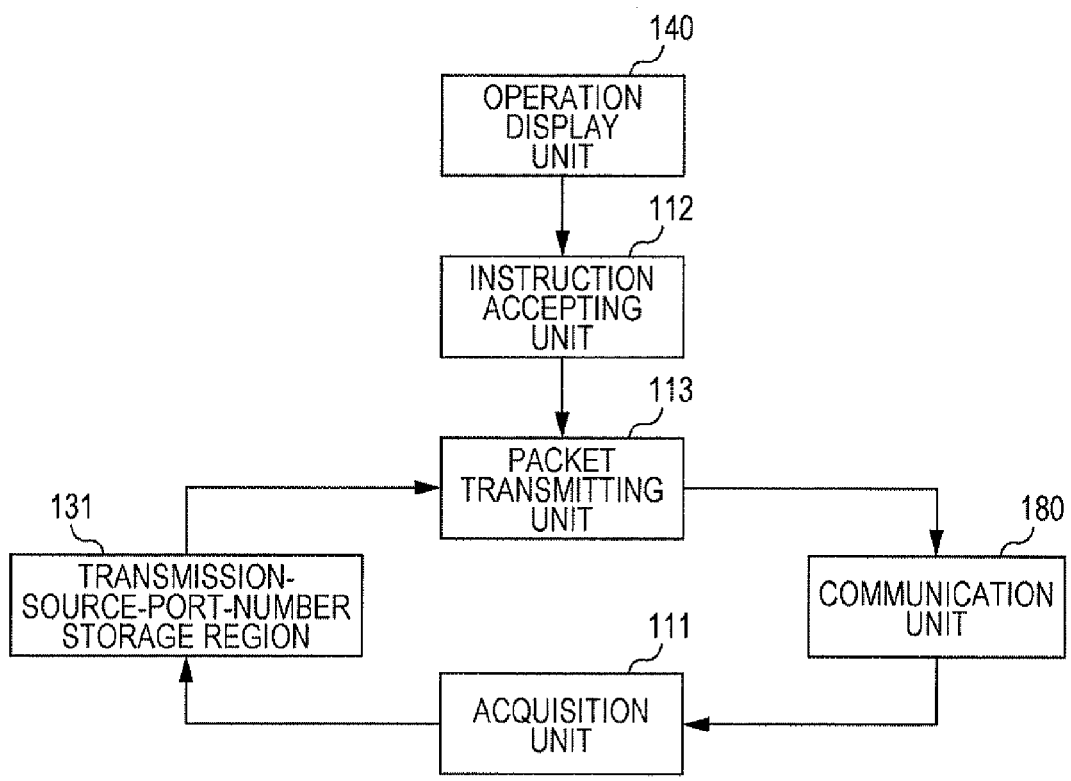
FIG. 4 is a block diagram illustrating an example of a functional configuration of the image forming apparatus.

Next, a functional configuration of the image forming apparatus 100 will be described with reference to FIG. 4. FIG. 4 is a block diagram illustrating an example of the functional configuration of the image forming apparatus 100. Referring to FIG. 4, the controller 120 reads and executes the computer program stored in the ROM 122 or the memory 130, whereby an acquisition unit 111, an instruction accepting unit 112, and a packet transmitting unit 113 are realized. Note that flows of data are schematically illustrated by arrows in FIG. 4. Referring to FIG. 4, the acquisition unit 111 is an example of an acquisition unit that acquires a transmission-source port number indicating a transmission source of data. In the exemplary embodiment, the acquisition unit 111 acquires a transmission-source port number as transmission-source information from the router 200.

The instruction accepting unit 112 is an example of an instruction accepting unit that accepts a transmission instruction to perform facsimile transmission via the intranet 300 or a transmission instruction to perform facsimile transmission via the public IP network 400. In the exemplary embodiment, the instruction accepting unit 112 accepts, in accordance with a signal that is output from the operation display unit 140 operated by the user, a transmission instruction to perform facsimile transmission.

The packet transmitting unit 113 generates a packet (data) of facsimile data in accordance with the transmission instruction that has been accepted by the instruction accepting unit 112, and transmits the generated packet (data). In the case where the transmission instruction accepted by the instruction accepting unit 112 is a transmission instruction to perform facsimile transmission via the public IP network 400, the packet transmitting unit 113 generates a packet whose transmission-source port number is a transmission-source port number stored in the transmission-source-port-number storage region 131, and transmits the generated packet via the router 200. In contrast, in the case where the transmission instruction accepted by the instruction accepting unit 112 is a transmission instruction to perform facsimile transmission via the intranet 300, the packet transmitting unit 113 generates a packet whose transmission-source port number is a number other than any one of the transmission-source port numbers stored in the transmission-source-port-number storage region 131, and transmits the generated packet. The packet transmitting unit 113 is an example of a generating unit and a data transmitting unit according to exemplary embodiments of the present invention.

In the exemplary embodiment, in the case where the transmission instruction accepted by the instruction accepting unit 112 is a transmission instruction to perform facsimile transmission via the public IP network 400, the packet transmitting unit 113 selects a transmission-source port number from among the multiple transmission-source port numbers indicated by the information stored in the transmission-source-port-number storage region 131, and generates, using the selected transmission-source port number, a packet. More specifically, for example, the packet transmitting unit 113 may select, in descending order or ascending order, a transmission-source port number from among the multiple transmission-source port numbers.

Figure 5:
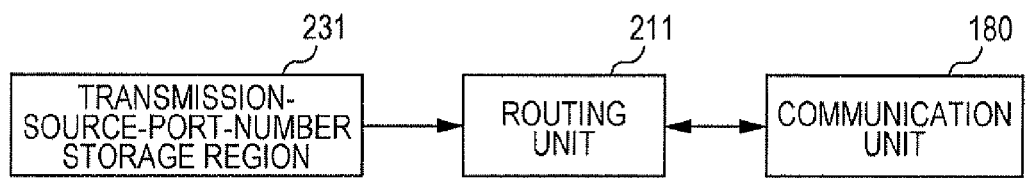
FIG. 5 is a block diagram illustrating an example of a functional configuration of the router.

FIG. 5 is a block diagram illustrating an example of a functional configuration of the router 200. Referring to FIG. 5, the controller 220 reads and executes the computer program stored in the ROM 222 or the memory 230, whereby a routing unit 211 is realized. Note that flows of data are schematically illustrated by arrows in FIG. 5. Referring to FIG. 5, the routing unit 211 performs routing for a transmitted packet so that a route via the intranet 300 or the public IP network 400 is selected for the transmitted packet. The routing unit 211 is an example of a routing unit according to an exemplary embodiment of the present invention. In the exemplary embodiment, the routing unit 211 performs routing in accordance with an IP address scheme. In addition, the routing unit 211 performs routing, for a packet whose transmission-source port number is in the range from 65525 to 65534, so that a route to the public-IP-network-400 side is selected for the packet, and, in contrast, performs routing, for a packet whose transmission-source port number is not in the range from 65525 to 65534, so that a route to the intranet-300 side is selected for the packet.

Operations

Next, a flow of a process performed by the controller 120 of the image forming apparatus 100 will be described with reference to a flowchart illustrated in FIG. 6. The user provides, by performing an operation on the operation display unit 140, an instruction indicating that IP fax transmission is to be performed, and the operation display unit 140 outputs a signal in accordance with the details of the operation performed on the operation display unit 140. This triggers execution of the process illustrated in FIG. 6. In the exemplary embodiment, the controller 120 establishes a call connection using SIP, and then, transmits, using T.38, facsimile data. First, the controller 120 transmits an INVITE request of SIP, thereby making a call-connection request (an SIP connection request) (step S1). The INVITE request is used to make a request for a call under SIP in order to start a session.

When the SIP server 800 connected to the public IP network 400 receives the INVITE request from the image forming apparatus 100, the SIP server 800 transmits a response to the INVITE request which is the SIP connection request. When the image forming apparatus 100 receives the response to the SIP connection request from the SIP server 800 (step S2), the image forming apparatus 100 analyzes, on the basis of the details of the response received from the SIP server 800, information (a transmission-destination IP address, a transmission-destination port number, and so forth) concerning communication using T.38 (an SIP connection result) (step S3). Furthermore, the controller 120 determines whether the IP fax transmission indicated by the instruction is transmission using an outside line (i.e., communication via the public IP network 400) or transmission using an inside line (i.e., communication via the intranet 300) (step S4). Whether the IP fax transmission is transmission using an outside line or an inside line may be determined on the basis of, for example, information that is output from the operation display unit 140 operated by the user (for example, when transmission using an outside line is selected using the operation display unit 140, it is determined that the IP fax transmission is transmission using an outside line). Moreover, whether or not the IP fax transmission is transmission using an outside line may be determined, for example, by determining whether or not a number starting with zero has been dialed (i.e., whether or not the first digit of a telephone number of a destination is zero).

When, as a result, it is determined that the IP fax transmission is transmission using an outside line, the controller 120 establishes, as a connection via the public IP network 400, a connection that is to be used for communication using T.38 (step S5). More specifically, the controller 120 establishes a connection in which the transmission-source port number is a transmission-source port number stored in the transmission-source-port-number storage region 131, for the transmission-destination IP address and the transmission-destination port number which have been obtained from a result of analysis that has already been performed.

In the exemplary embodiment, in step S5, when the selected transmission-source port number is not available (because of a reuse prohibition period), the controller 120 retries to establish a connection using another transmission-source port number stored in the transmission-source-port-number storage region 131. In this manner, during the period during which the selected transmission-source port number cannot be used (for example, while the selected transmission-source port number is being used), the controller 120 may select a transmission-source port number from among the other transmission-source port numbers again.

When it is determined in step S4 that the IP fax transmission is not transmission using an outside line (NO in step S4), the controller 120 establishes, as a connection via a network that is not the public IP network 400, a connection that is to be used for communication using T.38. More specifically, the controller 120 establishes a connection in which the transmission-source port number is a number other than any one of the transmission-source port numbers stored in the transmission-source-port-number storage region 131, for the transmission-destination IP address and the transmission-destination port number which have been obtained from the result of analysis that has already been performed (step S6).

When a connection to be used for communication using T.38 has been established, the controller 120 transmits, using T.38, facsimile data (step S7), and performs various types of processes associated with the IP fax transmission. When a process of transmitting facsimile data using T.38 finishes, the controller 120 transmits an SIP disconnection request to the SIP server 800 (step S8). When the controller 120 receives a response to the SIP disconnection request from the SIP server 800 (step S9), the controller 120 finishes the IP fax transmission.

Next, an example of an operation performed by the communication system 1 will be described with reference to sequence diagrams illustrated in FIGS. 7 and 8. FIG. 7 is a sequence diagram illustrating a flow of a process in the case where IP fax communication using an outside line (i.e., IP fax communication via the public IP network 400) is performed, and, more specifically, illustrates a flow of a process in the case where facsimile data is transmitted to the communication apparatus 900. FIG. 8 is a sequence diagram illustrating a flow of a process in the case where IP fax communication using an inside line (i.e., IP fax communication via the intranet 300) is performed, and, more specifically, illustrates a flow of a process in the case where facsimile data is transmitted to the communication apparatus 600. Referring to FIG. 7, first, the controller 120 of the image forming apparatus 100 transmits an SIP connection request to the SIP server 800 (step S11). When the SIP server 800 receives the SIP connection request, the SIP server 800 transmits the SIP connection request to the communication apparatus 900. When the communication apparatus 900 receives the SIP connection request, the communication apparatus 900 transmits a response to the SIP connection request. The SIP server 800 transmits a response to the image forming apparatus 100 on the basis of the response received from the communication apparatus 900 (step S12).

When the controller 120 receives the response from the SIP server 800, the controller 120 transmits, via the HGW 500, a transmission packet using T.38 to the communication apparatus 900 that is connected to the public IP network 400 and that is a transmission destination (step S13). In this case, the controller 120 transmits, as the transmission packet using T.38, a packet whose transmission-source port number is a transmission-source port number stored in the transmission-source-port-number storage region 131. The router 200 performs routing for the packet, which has been transmitted from the image forming apparatus 100, so that a route is selected for the packet. In this case, because the transmission-source port number of the transmitted packet is a transmission-source port number stored in the transmission-source-port-number storage region 131, the router 200 performs routing for the packet so that a route to the public-IP-network-400 side is selected for the packet. The communication apparatus 900 that is a transmission destination transmits a packet to the image forming apparatus 100, and the image forming apparatus 100 receives the transmitted packet (step S14). In this manner, IP fax transmission via the public IP network 400 is performed.

In contrast, in the case where IP fax transmission within the intranet 300 is performed, as illustrated in FIG. 8, the controller 120 transmits an SIP connection request (step S21), and receives an SIP response that has been transmitted as a response to the SIP connection request (step S22). When the controller 120 receives the response, the controller 120 transmits a transmission packet using T.38 to the communication apparatus 600 that is connected to the intranet 300 and that is a transmission destination (step S23). In this case, the controller 120 generates, as the transmission packet using T.38, a packet whose transmission-source port number is a number other than any one of the transmission-source port numbers stored in the transmission-source-port-number storage region 131, and transmits the generated packet. The router 200 performs routing for the packet, which has been transmitted from the image forming apparatus 100, so that a route is selected for the packet. In this case, because the transmission-source port number of the packet that has been transmitted from the image forming apparatus 100 is a transmission-source port number other than any one of the transmission-source port numbers stored in the transmission-source-port-number storage region 131, the router 200 performs routing for the packet so that a route to the intranet-300 side is selected for the packet. The communication apparatus 600 that is a transmission destination to which IP fax data is to be transmitted transmits a packet using T.38 to the image forming apparatus 100 (step S24). In this manner, IP fax transmission via the intranet 300 is performed.

As described above, in the present exemplary embodiment, for a packet of facsimile data that is to be transmitted to the public-IP-network-400 side, the controller 120 of the image forming apparatus 100 sets the transmission-source port number of the packet to a transmission-source port number stored in the transmission-source-port-number storage region 131. In contrast, for a packet of facsimile data that is to be transmitted to the intranet-300 side, the controller 120 sets the transmission-source port number of the packet to a number other than any one of the transmission-source port numbers stored in the transmission-source-port-number storage region 131. Furthermore, in the case where the transmission-source port number of a transmitted packet is a transmission-source port number stored in the transmission-source-port-number storage region 231, the controller 220 of the router 200 performs routing for the packet so that a route to the public-IP-network-400 side is selected for the packet. In contrast, in the case where the transmission-source port number of a transmitted packet is a number other than any one of the transmission-source port numbers stored in the transmission-source-port-number storage region 231, the controller 220 performs routing for the packet so that a route to the intranet-300 side is selected for the packet. In this manner, transmission of facsimile data from the image forming apparatus 100 to apparatuses that are each connected to the intranet 300 or the public IP network 400 is performed.

MODIFICATION EXAMPLES

The exemplary embodiment of the present invention is described above. However, the present invention is not limited to the above-described exemplary embodiment. Various modifications may be made. Examples of the various modifications will be described below as modification examples. Note that appropriate combinations of the modification examples given below may be provided.

First Modification Example

In the above-described exemplary embodiment, the intranet 300 is used as the first communication network according to an exemplary embodiment of the present invention, and the public IP network 400 is used as the second communication network according to an exemplary embodiment of the present invention. However, the first and second communication networks are not limited to the networks that are provided as examples in the above-described exemplary embodiment. Any multiple communication networks that are differently structured may be used. Moreover, in the above-described exemplary embodiment, an NGN is provided as an example of the public IP network. However, the public IP network is not limited thereto. Any communication network based on IP communication may be used.

Second Modification Example

In the above-described exemplary embodiment, T.38 is used as a protocol that is used to transmit facsimile data. However, the protocol used to transmit facsimile data is not limited thereto. Another protocol may be used. Additionally, in the above-described exemplary embodiment, the operations in the case where facsimile data is transmitted are described. However, the communication process in the above-described exemplary embodiment is not limited to transmission of facsimile data. For example, the communication process may be IP telephone communication using voice over internet protocol (VoIP). In addition to IP telephone communication using VoIP, the present invention may be applied to other various types of data communication.

Third Modification Example

In the above-described exemplary embodiment, a transmission-source port number is used as transmission-source information. The transmission-source information is not limited thereto. Any information that can be included in a packet and that indicates a transmission source may be used. Furthermore, in the above-described exemplary embodiment, the controller 120 acquires transmission-source information (a transmission-source port number) from the router 200. However, the configuration in which transmission-source information is acquired is not limited thereto. For example, a configuration may be used, in which transmission-source information is stored in the memory 130 in advance, and in which the stored transmission-source information is acquired.

Fourth Modification Example

In the above-described exemplary embodiment, a configuration is used, in which information indicating port numbers that are in a range determined in advance is stored in the transmission-source-port-number storage region 131. However, the information stored in the transmission-source-port-number storage region 131 is not limited thereto. A configuration in which one or multiple port numbers are stored may be used. In the case where multiple transmission-source port numbers are stored in the transmission-source-port-number storage region 131, the controller 120 may select a transmission-source port number from among the transmission-source port numbers in accordance with an algorithm that is determined in advance.

Moreover, in the above-described exemplary embodiment, an example in which the controller 120 selects, in the order of ascending or descending transmission-source port number, a transmission-source port number from among the multiple transmission-source port numbers is described. However, the manner in which a transmission-source port number is selected is not limited thereto, and another manner may be used. For example, the controller 120 may randomly select a transmission-source port number to be used from among the multiple transmission-source port numbers in accordance with a random function that is determined advance. Any algorithm which is determined in advance and in accordance with which the controller 120 selects a transmission-source port number from among the multiple transmission-source port numbers may be used.

Fifth Modification Example

The above-described program stored in the ROM 122 or the memory 130 and the above-described program stored in the ROM 222 or the memory 230 may be provided in a state of being stored in a computer-readable recording medium such as a magnetic recording medium (a magnetic tape, a magnetic disk (a hard disk drive (HDD) or a flexible disk (FD)), or the like), an optical recording medium (an optical disk or the like), a magneto-optical recording medium, or a semiconductor memory. Furthermore, the image forming apparatus 100 or the router 200 may be caused to download the programs via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus comprising:
an instruction accepting unit, operable on a processor, that accepts a transmission instruction which is a transmission instruction to transmit data via a first communication network or a transmission instruction to transmit data via a second communication network;
a transmission source port number storage region, on the communication apparatus, that stores a predetermined number which indicates a transmission source of data;
a generating unit, operable on a processor, that, when the transmission instruction accepted by the instruction accepting unit is a transmission instruction to transmit data via the second communication network, generates data including the predetermined number which indicates a transmission source of data and which is determined every time transmission of data is to be performed; and
a data transmitting unit, operable on a processor, that transmits, to a communication control apparatus, the data generated by the generating unit, the communication control apparatus being an apparatus that performs routing for the transmitted data so that a route via the first communication network or a route via the second communication network is selected for the transmitted data in accordance with whether or not a predetermined number included in the transmitted data is a number which is determined in advance and that is connected to the first communication network and the second communication network,
wherein the generating unit, the data transmitting unit, and the instruction accepting unit are part of the communication apparatus.

2. The communication apparatus according to claim 1,
wherein a plurality of transmission-source port numbers are acquired,
wherein the predetermined number comprises a selected transmission-source port number, and
wherein, when the plurality of numbers have been acquired, the generating unit selects a number from among the plurality of numbers, and generates data including the selected number.

3. The communication apparatus according to claim 2, wherein the data transmitting unit selects, in an order that is determined in advance, a transmission-source port number from among the plurality of transmission-source port numbers.

4. The communication apparatus according to claim 2, wherein, during a time period during which the selected transmission-source port number is not available, the data transmitting unit selects, again, a transmission-source port number other than the selected transmission-source port number from among the plurality of transmission-source port numbers.

5. The communication apparatus according to claim 4, wherein the data transmitting unit selects, in an order that is determined in advance, a transmission-source port number from among the plurality of transmission-source port numbers.

6. The communication apparatus according to claim 1, wherein the generating unit that, when the transmission instruction accepted by the instruction accepting unit is a transmission instruction to transmit data via the first communication network, generates a data including a number which doesn't include the predetermine number.

7. The communication apparatus according to claim 1, wherein in the first communication network and the second communication network, one is the public IP network and the other is the intranet.

8. A communication system comprising:
a communication apparatus; and
a communication control apparatus that is connected to the communication apparatus,
a first communication network, and a second communication network,
the communication apparatus including:
a transmission source port number storage region, on the communication apparatus, that stores a predetermined number which indicates a transmission source of data;
an instruction accepting unit, operable on a processor, that accepts a transmission instruction which is a transmission instruction to transmit data via the first communication network or a transmission instruction to transmit data via the second communication network,
a generating unit, operable on a processor, that, when the transmission instruction accepted by the instruction accepting unit is a transmission instruction to transmit data via the second communication network, generates data including the predetermined number which indicates a transmission source of data and which is determined every time transmission of data is to be performed, and
a data transmitting unit, operable on a processor, that transmits, to the communication control apparatus, the data generated by the generating unit,
wherein the generating unit, the data transmitting unit, and the instruction accepting unit are part of the same communication apparatus, and
the communication control apparatus including:
a memory that stores a transmission-source port number indicating a transmission source of data, and
a router that performs routing for the transmitted data so that a route via the first communication network or a route via the second communication network is selected for the transmitted data, and that, when a transmission-source port number included in the transmitted data is the predetermined number stored in the memory, performs routing for the transmitted data so that a route via the second communication network is selected for the transmitted data.

9. A communication method comprising:
accepting, at a communication apparatus, a transmission instruction which is a transmission instruction to transmit data via a first communication network or a transmission instruction to transmit data via a second communication network;
generating at the communication apparatus, when the accepted transmission instruction is a transmission instruction to transmit data via the second communication network, data including a predetermined number which indicates a transmission source of data and which is determined every time transmission of data is to be performed; and
transmitting the generated data to a communication control apparatus from the communication apparatus, the communication control apparatus being an apparatus that performs routing for the transmitted data so that a route via the first communication network or a route via the second communication network is selected for the transmitted data in accordance with whether or not the predetermined number included in the transmitted data is a number which is determined in advance and that is connected to the first communication network and the second communication network.

* * * * *